March 29, 1966 H. H. ABBOTT 3,243,515
DIAL PULSE REGISTER CIRCUIT
Filed Jan. 28, 1963
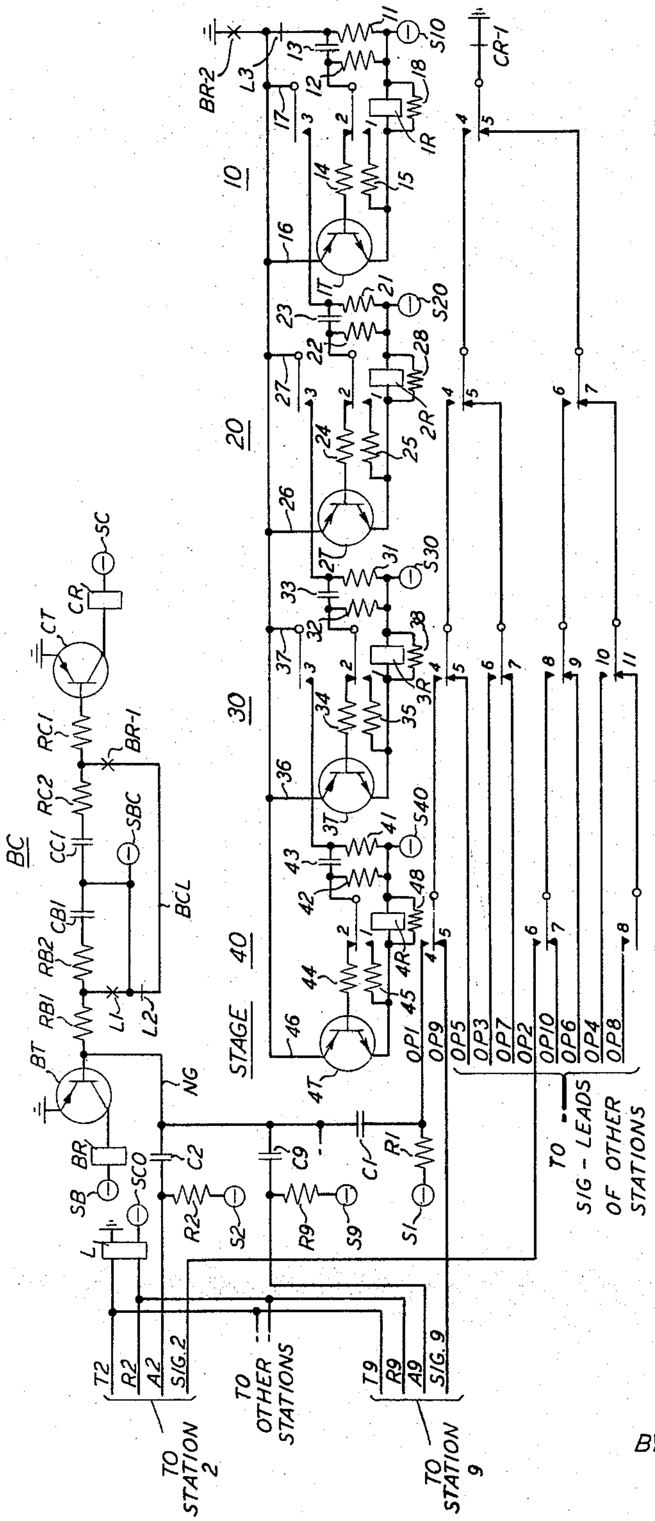
INVENTOR
H. H. ABBOTT
BY [signature]
ATTORNEY United States Patent Office 3,243,515 Patented Mar. 29, 1966

3,243,515
DIAL PULSE REGISTER CIRCUIT

Henry H. Abbott, Middletown, N.J., assignor to Bell Telephone Laboratories, Incorporated, New York, N.Y., a corporation of New York Filed Jan. 28, 1963, Ser. No. 254,127
15 Claims. (Cl. 179—18)

This invention relates to a dial pulse register circuit and more particularly, to such a circuit as employed in a dial selective telephone intercommunicating system.

Recent developments in telephone systems have been accompanied by various new arrangements designed to improve the efficiency of such systems with a close regard to such factors as speed of operation and increased flexibility for telephone subscribers. However, most of these improvements are necessarily still dependent upon one of the standard electrical signaling arrangements common to most telephone systems, that is, dial pulsing.

For example, telephone intercommunicating systems have gained wide acceptance and have been extensively used in accordance with the demands and requirements of telephone customers. Some subscribers in a particular location require rapid and readily accessible contact with others in their immediate vicinity, in addition to the more usual contacts with people not in close proximity to such locations. Thus, for example, businessmen in a given building, or a certain restricted group of PBX subscribers often must maintain almost constant and readily available communication with each other.

Of the circuit portions upon which such arrangements depend, one of the most obviously essential is the dial pulse register circuit. In order to make such circuits and therefore the systems upon which they depend practicable, size and cost considerations have assumed positions of paramount importance.

It is therefore an object of this invention to provide a dial pulse register circuit whose use will be economically feasible in modern miniature intercommunicating telephone systems.

In this regard, it is desirable to take advantage to as great an extent as possible of certain contemporary switching devices representative of some of the newer technologies such as solid state. Such devices, integrated and properly utilized in dial pulse responsive circuitry, will in many cases enhance the economy of such circuits. Nevertheless, it is equally desirable to maintain compatibility with existing equipment by still utilizing to some degree relay contact arrangements to steer dial pulses and other similar signals.

Thus, it is a further object of this invention to provide a dial pulse register circuit utilizing semiconductor devices in conjunction with electromechanical arrangements.

As an extension of the use of such new components, it will be seen that the increased and wider use of semiconductors succeeds in laying the foundation for miniaturization and cost improvements as the solid state art continues to develop and improve. Furthermore, utilization of such structural arrangements advantageously leads to more reliable performance standards through the use of fewer mechanical switching arrangements.

It is therefore another object of this invention to provide more reliable dial pulse responsive operation by reducing the number of movable contacts utilized therein.

Another problem which prior art pulse responsive circuits have not eliminated entirely satisfactorily is that of the mutilation of electrical signals by spurious or irregular relay contact movement. Such mutilation can obviously be destructive of a counting arrangement which is necessarily dependent, for example, upon a sequential set of regularly shaped pulses.

Still another object of this invention is to provide a dial pulse register circuit which is properly responsive to dial pulses, the wave shapes of some of which may be irregular.

A related problem in prior art sequential switching arrangements has been the breaking of pulse current by the untimely opening of relay contacts. Although these contacts were responding appropriately to the energization of their relays' windings, their operation while current still flowed through the contacts resulted in the attendant wear and erosion of the contacts, with correspondingly increased maintenance and inspection necessitated thereby.

Thus a further object of this invention is to steer pulses to responsive equipment through relay contacts and yet avoid contact operation during such steering.

The use of dial pulse responsive equipment in conjunction with subscriber-activated apparatus often depends on proper subscriber dialing, for example. Dialing errors occasionally result, however, due to careless "fumbling" with the handset as the subscriber lifts the receiver; this may cause the registration of a single erroneous digit which will severely impair the accuracy of dialing.

It is therefore an object of this invention to eliminate the effect of an error digit mistakenly registered by switchhook fumbling.

Arrangements which have been utilized in the past to record a train of successive dial pulses have varied in their structural topology and many of these, due to their peculiar characteristics, could not be employed in conjunction with certain other prior art arrangements already in wide use among telephone subscribers. It is of course desirable for any pulse register arrangement to be capable of being integrated into existing telephone plant equipment.

An additional object of this invention is to provide a dial pulse register circuit which is made compatible with existing systems through the use of cascaded binary cells.

These and other objects of this invention are attained in one particular embodiment thereof which illustrates a dial pulse register circuit as applied to a dial selective intercommunicating telephone system. This disclosed embodiment makes use of a binary counter, each stage of which comprises a PNPN transistor and an associated miniature relay. In an individual stage of the register, the semiconductor device serves to provide "memory" for the stage by furnishing a locking path for its associated relay when the triode is conducting.

The PNPN triode in the first stage of the counter is activated through its associated relay's normal contacts from a capacitor which is charged in response to dial pulses. Since the capacitor is fully charged after the initial movement of the line relay contact which furnishes dial pulses to it, the differentiated signal delivered to the PNPN triode from the capacitor is independent of subsequent contact movement or "chatter" by the line relay contact. It may therefore be said that uniform triggering signals are provided to the PNPN triode.

Furthermore, this signal which triggers the PNPN device is of sufficiently short duration so as to be completely dissipated prior to the operation or release of the associated relay (in response to the PNPN device's operation or release) through the contacts of which the signal is steered. Breaking of pulse current is thereby avoided.

Each stage of the counter is similarly energized by the application of a dial pulse responsive signal to its associated PNPN transistor through a similarly connected capacitor. An individual stage is released when a subsequent signal is applied to the capacitor after the associated relay in the stage has fully operated, thereby rendering the transistor nonconductive and subsequently causing the associated relay to release.

In accordance with an aspect of my invention, in this specific illustrative embodiment, a line circuit which is common to a given plurality of stations amongst which telephone intercommunicating is desired incorporates such dial pulse register circuits. Dial selective intercommunication is obtained between any two stations of the system in the following manner. When a calling party goes off hook, the common line relay is operated, shortly thereafter resulting in the operation of two additional relays which remain operated throughout dial pulsing. A contact of the line relay provides dial pulses to the register input as mentioned supra. One of the two additional relays furnishes signals to a common bus and thence to individual stages of the register which may be operated, serving to operate succeeding stages through the closed contacts of preceding stages. A relay "tree," the contact configuration of which is set up in response to the particular digit which may be dialed by the calling party, is prevented from connecting an energizing signal to the called party or station until after dial pulsing is completed. In addition, the registration of the single digit "1" in response to dialing or switchhook "fumble" is recognized by the register as an error digit. In response to such registration, a signal is provided through the relay tree to release the register circuit and thus recondition it to be responsive to subsequent legitimate dialing.

It is a feature of this invention that each stage of a dial pulse register circuit employs a PNPN triode and a relay.

Another feature of this invention is that the PNPN triode in each stage provides a locking path for its associated relay.

It is a further feature of this invention that differentiated signals representative of dial pulses activate selected stages of a register circuit, each stage of which includes a PNPN transistor and a relay.

A related feature of this invention includes means for steering such signals to stages of the register through relay contacts which operate after the signals have been dissipated, thus avoiding breaking pulse current.

An additional feature of this invention includes facilities for making each of the responsive stages of a dial pulse register circuit independent of any exact or precise dial pulse wave form.

Still another feature of this invention is facilities whereby interstage gating of signals in a dial pulse register circuit is provided to the PNPN transistor in a given stage through the relay contacts in that and preceding stages.

Additional objects and features of this invention will become readily apparent when taken in conjunction with the following description, appended claims and the drawing which discloses an illustrative embodiment of a dial pulse register circuit utilizing the principles of the instant invention as applied to an illustrative dial selective intercommunicating system.

GENERAL DESCRIPTION

The dial selective intercommunicating arrangement disclosed in the drawing provides such intercommunicating service to nine interconnected subscribers. It is to be understood that additional subscribers could readily be served in a similar manner utilizing the principles of my invention.

A common line circuit is disclosed which provides access to the dial pulse register circuit for illustrative stations 2 through 10, only stations 2 and 9 being shown. This common line circuit includes the standard line relay L and a control circuit BC, comprising switching transistors BT and CT and the corresponding relays BR and CR respectively. Individual to each of the stations of the system are tip and ring leads T– R–, offhook ground leads A– and signaling leads SIG–; furthermore, individual sources S–, resistors R–, and capacitors C– connect through common lead NG to the base of transistor BT to allow a ground signal on the corresponding individual station lead A– to temporarily disable transistor BT with a positive pulse to its base.

Each of the stages 10, 20, 30, and 40 of the illustrative dial pulse register circuit comprises a relay such as 1R in stage 10, and an associated PNPN transistor such as 1T in that stage. The PNPN transistors disclosed in the instant invention operate in general accordance with those principles described in I. M. Ross Patent 2,877,359, issued March 10, 1959. Thus, as regards the operation of stage 10, although the closure of make contact BR–2 provides ground to lead 16 and thus a potential difference across the anode and cathode electrodes of transistor 1T equal to the difference between ground and negative source S10, the absence of a properly polarized triggering signal to the control electrode of the transistor 1T, applied for example, through the capacitor 13 and normally closed contact 2 of relay 1R and resistor 14, will result in transistor 1T remaining nonconductive. This, it will be seen, prevents relay 1R in stage 10 from operating, since its only possible operating path is through PNPN transistor 1T. When the appropriate signal is applied to the control electrode of a PNPN transistor such as 1T in stage 10, rendering that transistor conductive, the corresponding relay such as 1R may obviously operate. The triggering signal from capacitor 13 is dissipated before steering contact 2 of relay 1R breaks its connection; breaking of pulse current and corresponding contact erosion are thus avoided. The closure of normally open contact 3 of relay 1R provides an enabling signal to the energizing capacitor of the following stage; i.e., capacitor 23 of stage 20 is positively charged from grounded contact BR–2 and over lead 17 through now closed contact 3 of relay 1R. This sequential operation will be more fully described infra.

The "relay tree" shown at the bottom of the figure includes a cascaded array of contacts responsive to relays 1R, 2R, 3R, and 4R in stages 10, 20, 30, and 40 respectively. More specifically, the tree arrangement includes contacts 4 and 5 of relay 1R, contacts 4 through 7 of relay 2R, contacts 4 through 11 of relay 3R and contacts 4 through 8 of relay 4R. Since break contact CR–1 is open during the pulse registration and the responsive operation of the relay tree contacts, the ground connected to break contact CR–1 is not initially connected through the tree to output leads OP– and thence to the lead SIG– of the selectively dialed party or station. However, when dial pulsing has been completed, relay CR in the common line circuit releases, thereby closing a path from ground through normally closed break contact CR–1 and thence through the "branches" of the relay tree and the selected output lead OP– to the SIG– lead of the called station, thereby activating an appropriate and well-known signaling device at the called station such as a lamp, a buzzer, etc.

Although the illustrative embodiment herein disclosed utilizes four stages merely by way of description, certain contact savings are thereby realized when single digit dial selective intercommunication is desired. That is, when any two of the nine illustrative intercommunicating stations wish to communicate with each other by merely dialing one digit (the use of the remaining digit, in this case "1," to provide for accidental or abortive dialing attempts, will be fully explained in the detailed description), the full capacity of the register is not employed. The contact savings obtain from the fact that although the register could count 16 pulses with four stages, the relay contact tree need only count 10 pulses in the instant embodiment, reducing the number of required tree contacts on relay 4R, for example.

DETAILED DESCRIPTION

A description of an illustrative call between two stations of the dial selective intercommunicating system disclosed in the drawing will now be undertaken.

*Illustrative intercommunication call*

It will be assumed, by way of appropriate example, that the party at station 2 wishes to communicate on an "intercom" basis with station 9 using the instant arrangement. When station 2 goes off hook, an operating path is provided for the common line relay L from ground through the winding of the relay, across tip conductor T2, through the closed switchhook contacts at the station 2 subset (not shown), and over ring conductor R2 to the negative potential source SCO through the winding of relay L. This initial operation of the line relay has one immediate result. This result is in the control circuit BC, whereby negative source SBC is connected through closed make contact L1 and resistor RB1 to the base of transistor BT. This results in the application of a negative pulse to the base of transistor BT, thereby rendering that transistor conductive. (It may be noted at this point that a positive disabling pulse was applied over lead NG to the base of transistor BT due to the appearance of ground over lead A2 when station 2 went off hook; an off-hook ground may be placed on the station leads A– in any suitable and well-known manner, such as that shown in H. T. Carter Patent 2,850,579, issued September 2, 1958. Such a pulse would not, however, affect normally nonconductive transistor BT.)

When transistor BT thus becomes conductive, an operating path is thereby provided for relay BR from ground through the emitter-collector path of transistor BT to negative source SB through the winding of relay BR. The operation of relay BR causes its two responsive make contacts BR–1 and BR–2 to close. The closure of contact BR–1 however, has no immediate effect since line relay break contact L2 is open; transistor CT therefore remains, at least for the moment, nonconductive. Similarly, the closure of make contact BR–2 initially only provides ground to the commonly connected anodes of the PNPN transistors 1T through 4T of the respective stages 10 through 40 of the register circuit over leads 16, 26, 36 and 46 respectively. As mentioned supra however, the PNPN transistors in each stage of the pulse counting arrangement remain nonconductive due to the absence of any control signal on their respective control electrodes. In addition, the open condition of line relay break contact L3, connected to make contact BR–2, initially prevents the application of any enabling signal to the first stage 10 of the register circuit. Finally, although break contact CR–1 is in its normally closed state at this juncture, it can be seen that the relay tree does not provide the enabling calling ground from contact CR–1 to any SIG– lead of an intercommunicating station.

Since it has been assumed that the party at station 2 wishes to communicate with station 9, the calling party commences the calling operation by dialing the digit corresponding to the station with which the party desires to be connected, i.e., the digit 9. The line relay L "follows" this dial pulsing in a well-known manner, its operating path being alternately interrupted and then recompleted; it is apparent that there will be nine such interruptions under the conditions of the illustrative call being initiated by station 2. Upon the first interruption or "break," the line relay contacts L1, L2, and L3 return to their normal position, with L1 open and L2 and L3 closed. When contact L1 opens, the effect of negative potential source SBC is maintained at the base of transistor BT by the time constant relationship of resistors RB1 annd RB2 and capacitor CB1. Transistor BT thereby remains conductive, the duration of the time constant conveniently exceeding the time during which contact L1 is open. Relay BR will thus remain operated throughout dial pulsing.

The return of break contact L2 to its normal or closed condition provides an enabling negative pulse to the base of transistor CT over a path which may be traced from negative potential source SBC, through normally closed break contact L2, over lead BCL and through closed make contact BR–1 to the base of transistor CT through resistor RC1. Transistor CT thereby turns on, completing an operating path for its relay CR, such a path being traceable from the grounded emitter of transistor CT through its collector and the winding of relay CR to negative potential source SC. The operation of relay CR causes its responsive break contact CR–1 to open, thereby preventing the application of the enabling ground, connected to break contact CR–1, to the SIG– lead of any station until dial pulsing has been completed. As with relay BR described supra, relay CR remains operated throughout pulsing via the expeditious selection of resistors RC1 and RC2 and capacitor CC1, the combined time constant effect of which is to maintain transistor CT conductive throughout pulsing.

The closure of normally closed line relay break contact L3 initiates the pulse registration and counting process by closing a path for the application of ground to the right-hand electrode or plate of triggering capacitor 13 of stage 10. This path is readily apparent and is seen to proceed from ground through closed make contact BR–2 and through closed contact L3. Since the right-hand plate of capacitor 13 is normally maintained at a relatively negative potential due to the connection thereto of negative source S10 through resistor 11, the application of ground to the terminal connecting resistor 11 with capacitor 13 causes an obvious potential rise at that point. A positive enabling pulse is thereby provided through capacitor 13 to the control electrode of PNPN transistor 1T through normally closed contact 2 of relay 1R and resistor 14. This differentiated pulse, it will be noted, stems from the charging of capacitor 13 in response to the leading edge of the dial pulse produced by the closure of contact L3; subsequent line relay contact "chatter," which would ordinarily tend to provide irregularly shaped dial pulses to capacitor 13 and perhaps erroneously set a register stage, is thereby rendered ineffective. Such a pulse serves to render PNPN transistor 1T conductive, thus providing an operating path for relay 1R traceable from grounded make contact BR–2 over conductor 16 in stage 10 and through the anode-cathode connection of PNPN transistor 1T to negative potential source S10 through the winding of relay 1R. When relay 1R thereby operates, the only immediate effect thereof is to provide a positive enabling signal to transistor 2T of stage 20 through contact 3 of relay 1R. The interruption of the path which includes contact 2 of relay 1R and the similar completion of a path which now includes contact 1 of relay 1R have no immediate effects on the operation of the circuit.

However, the positive enabling ground signal applied to the common terminal of capacitor 23 and resistor 21 of stage 20 over a path traceable from grounded make contact BR-2 across lead 17 and through closed make contact 3 of relay 1R, serves to energize transistor 2T of stage 20 in a manner substantially identical to that described with relation to stage 10. After transistor 2T turns on, relay 2R operates as did relay 1R in stage 10, providing an enabling signal to transistor 3T of stage 30. Transistors 3T and 4T of stages 30 and 40 respectively subsequently turn on, providing similar operating paths for responsive relays 3R and 4R respectively.

Therefore, in response to the first break in the operate path for line relay L, each of the stages 10 through 40 of the register circuit operates in rapid sequence, and although the contacts of each of the relays 1R to 4R in the relay tree operate, no path is connected through to the SIG– leads since break contact CR–1 remains open throughout dial pulsing.

When the second dial break occurs, thereby again interrupting the operating path of line relay L, break contact L3 closes and provides in a manner identical to that described above, a positive pulse through capacitor 13 to the lower of the two steering armatures of relay 1R. Since relay 1R had priorly operated in response to the first dial break, this positive pulse is delivered from capacitor 13 through closed contact 1 of relay 1R and resistor 15 to the cathode of PNPN transistor 1T. In accordance with well-known semiconductor operation, this back-biases PNPN transistor 1T and turns it off; in response thereto, relay 1R releases since its operating path has been broken. Resistor 18 shunting the winding of relay 1R absorbs the voltage generated across this winding when the current through it is interrupted. This is the only effect which the second dial break, represented by the opening of contact L3, has on the register circuit. Although the release of relay 1R opens its contact 3 and thus removes ground from the right-hand plate of capacitor 23 in stage 20, the resultant negative pulse which is provided to the cathode of transistor 2T in stage 20 through capacitor 23, closed contact 1 of relay 2R and resistor 25, does not affect the conduction. Therefore, after the second dial break, relays 2R, 3R, and 4R of stages 20, 30, and 40 respectively are operated, while only relay 1R of stage 10 is released.

In response to the third dial break, a positive enabling signal is applied on the control electrode of transistor 1T over the previously described path which includes ground through closed make contact BR–2, closed break contact L3, capacitor 13, normally closed contact 2 of relay 1R and resistor 14. Transistor 1T thereby becomes conductive (operating relay 1R) and a similar positive pulse is applied through its now closed contact 3, which is grounded over lead 17 connected to closed make contact BR–2, to the cathode of transistor 2T in stage 20 over a path including capacitor 23, closed contact 1 of relay 2R and resistor 25 in stage 20. Transistor 2T is rendered nonconductive thereby and relay 2R subsequently releases, its operating path having been broken. As was the case with the second dial break, the removal of ground from the triggering capacitor of the stage following one which has turned off, namely, capacitor 33 of stage 30, merely provides supplemental forward biasing for transistor 3T of stage 30. The third dial break has thereby resulted in the operation of relay 1R and the release of relay 2R, relays 3R and 4R remaining operated.

The pulse counting sequence continues in a substantially identical manner readily apparent to those skilled in the art and in order to facilitate this description, the actual counting will be resumed after the eighth dial break. At this point, stages 10, 20, and 30 are off with their respective relays 1R, 2R, and 3R released. Only relay 4R of stage 40 is operated. The ninth and final dial break (in accordance with the assumption supra that the digit 9 has been dialed) causes the rapid sequential operation of relays 1R, 2R, and 3R in a manner identical to that described supra. Regarding the effect on stage 40, the operation of relay 3R in stage 30 provides a ground signal to the right-hand plate of capacitor 43 over a path which includes closed make contact BR–2, lead 37, and closed contact 3 of relay 3R. The resultant potential rise at the terminal connecting resistor 41 and capacitor 43 provides a positive disabling pulse to the cathode of PNPN transistor 14 of stage 40 over the path traceable from capacitor 43, through closed contact 1 of relay 4R and through resistor 45. Transistor 4T is therefore turned off causing the release of relay 4R. Thus, after the completion of dialing the digit 9, relays 1R, 2R, and 3R are operated while relay 4R is released.

Since line relay L reoperated after the ninth dial break, the path between negative potential source SBC and the base of transistor CT is interrupted by the opening of break contact L2. Transistor CT thereby turns off after an interval greater than that provided by the time constant of resistors RC1 and RC2 and capacitor CC1 has elapsed. It should be noted that the time constant characteristic associated with transistor CT is only sufficiently long so as to allow transistor CT to remain conductive (thereby holding relay CR operated) during an interpulse interval. Relay CR may thereby remain in its operated state so long as dialing continues. Now, however, since dial pulsing has been completed with the dialing of the digit 9, transistor CT turns off and relay CR releases. Break contact CR–1 thereby closes ground through the relay tree to the SIG9 lead of station 9 over a path which includes closed contact 4 of relay 1R, closed contact 4 of relay 2R, closed contact 4 of relay 3R, and normally closed contact 5 of relay 4R and output lead OP9. Well-known and appropriately responsive signaling equipment (not shown) at station 9 is thereby energized to inform the party at station 9 that he is being called.

Assuming that station 9 goes off hook in response to such a signal, a ground-disconnect signal thereby appears on that station's A9 lead in a manner shown, for example, in the Carter patent cited supra. The appearance of this ground signal provided across lead A9 to the terminal connecting resistor R9 and capacitor C9 individual to stage 9, causes a rise in potential at that point due to the prior effect thereat of negative potential source S9. A positive disabling signal is thus provided through capacitor C9 and over lead NG to the base of the transistor BT. Transistor BT is thereby rendered nonconductive, relay BR releasing in response thereto. The path which includes make contact BR–1 is thereby broken, but this has no outstanding effect since the transistor CT was already off. However, when make contact BR–2 opens, the forward-biasing ground previously provided through that contact in the closed state to maintain PNPN transistors 1T, 2T, and 3T conductive after the ninth pulse over leads 16, 26, and 36 respectively, is now removed. The turning off of transistors 1T, 2T, and 3T causes the release of relays 1R, 2R, and 3R respectively; it will be recalled that relay 4R released in response to the ninth dial break. The entire register circuit is now returned to normal and no subsequent operation thereof can occur with make contact BR–2 in its normal open condition.

The parties at stations 2 and 9 are now connected for talking purposes over an obvious path which includes their respective subsets (not shown) and their respective tip and ring conductors T2 and R2, and T9 and R9.

*If error digit dialed when calling party goes off hook*

An additional aspect of this invention includes facilities for returning the entire circuit to its normal condition should a stray or spurious digit be transmitted by the calling party through, for example, careless fumbling with the handset. This may cause an accidental unwanted solitary release of the switchhook contacts prior to dialing, thus interrupting the operating path of line relay L. In such an event, transistor BT, which operated when the calling party went off hook, and transistor CT, which became conductive upon the erroneous first dialing break assumed herein, cause the operation of relays BR and CR respectively. The closure of ground through make contact BR–2 thereby conditions the circuit to be energized, but since only one spurious dial break occurs in this example, the result is the same as after the first dial break in a regular dialing process such as that described supra. That is, stages 10, 20, 30, and 40 operate in rapid sequence, resulting in the similar operation of relays 1R, 2R, 3R, and 4R respectively.

Since control source SBC has been removed from the base of transistor CT after this single dial break via the opening of break contact L2, transistor CT becomes nonconductive after a time period greater than its time constant characteristic has passed. Relay CR then releases. The resultant closure of normally closed break contact CR–1 provides a disabling positive pulse to the base of transistor BT caused by the appearance of ground at the terminal connecting resistor R1 and capacitor C1 over a path which now includes closed break contact CR–1 and closed contact 4 of each of the relays 1R through 4R and output lead OP1. The rise in potential at that terminal caused by the potential difference between ground and negative source S1 delivers the temporarily disabling signal to the base of transistor BT through capacitor C1 and over lead NG. When transistor BT thereby momentarily turns off, relay BR subsequently releases. The momentary release of relay BR removes the forward-biasing ground from the register circuit when make contact BR-2 opens, as described supra, thereby returning the register circuit to normal in a manner substantially identical to that described when the called party supra went off hook.

Prior to the commencement of legitimate dialing, the effect of this disabling pulse to the base of transistor BT is dissipated, and the effect of negative potential source SBC connected to the base of transistor BT through closed line relay make contact L1 and resistor RB1 again renders transistor BT conductive, thereby operating relay BR. The control circuit BC and the register circuit are each therefore properly conditioned to receive dialing pulses and the otherwise erroneous effect of the spurious dialing break has been eliminated.

The components utilized in this specific illustrative embodiment may take the following illustrative values:

| | |
|---|---|
| Resistors RB1 and RC1 ------------kilohms-- | 200 |
| Resistors RB2 and RC2 ----------------ohms-- | 200 |
| Capacitors CB1 and CC1 ---------microfarads-- | 1 |
| Resistors R1 through R10 (only resistors R1, R2, and R9 being shown) -------------kilohms-- | 10 |
| Capacitors C1 through C10 (only capacitors C1, C2, and C9 being shown) ----------microfarads-- | 1 |
| Resistors 11, 12, 13, and 14 in stage 10 (and the corresponding resistors in stages 20, 30, and 40) kilohms-- | 10 |
| Resistor 15 in stage 10 (and the corresponding resistors in stages 20, 30, and 40) ---------ohms-- | 500 |
| Resistor 18 in stage 10 (and corresponding resistors in stages 20, 30, and 40) -------------ohms-- | 900 |
| Capacitor 13 in stage 10 (and the corresponding capacitors in stages 20, 30, and 40) micromicrofarads-- | 100 |
| All potential sources ------------------volts-- | —24 |

It is to be understood that the above-described arrangements are illustrative of the application of the principles of the invention. Numerous other arrangements may be devised by those skilled in the art without departing from the spirit and scope of the invention.

What is claimed is:

1. A dial pulse register circuit responsive to dial pulses for selecting one of a plurality of output paths comprising a plurality of bistable stages, each of said stages including first semiconductor switching means capable of changing state in response to signals representative of selected ones of said pulses and second relatively slower electromechanical switching means operative after said signals have terminated and in response to said changes in state of said first switching means for steering said signals to said first switching means in succeeding ones of said stages.

2. A dial pulse register circuit in accordance with claim 1 including in addition output means responsive to the operation of said second switching means for selecting said one of said paths corresponding to said dial pulses.

3. A dial pulse register circuit in accordance with claim 1 including in addition first charging means responsive to said pulses for transmitting said signals to said first switching means of one of said stages and second charging means responsive to selected ones of said pulses for transmitting said signals to additional ones of said second switching means.

4. A dial pulse register circuit in accordance with claim 1 wherein said first switching means includes a PNPN transistor and said second switching means includes a relay.

5. A dial pulse register circuit responsive to signals having digital significance comprising a cascaded array of binary cells, a particular one of said cells including first semiconductor switching means responsive to selected ones of said signals, second electromechanical switching means for steering said signals to change the state of said first switching means in said particular cell and operative after said signals have been steered to said first switching means, and means responsive to said second switching means for providing additional ones of said signals to said first switching means in succeeding ones of said cells.

6. In a telephone system, a register circuit; a plurality of intercommunicating channels; line means responsive to a service request over said channels; means including said line means for delivering dial pulses from said channels to said register circuit; and a plurality of switching stages included in said register, each of said stages comprising a first switching element capable of assuming one of a plurality of stable states in response to signals representative of said pulses and a second switching element operative in response to changes in state of said first switching element after said signals have terminated to transmit additional signals to said first switching element in succeeding ones of said stages.

7. A telephone system in accordance with claim 6 including in addition means responsive to the operation of said second switching element for energizing one of said plurality of channels selected in accordance with the digital representation of said pulses.

8. A telephone system in accordance with claim 6 including in addition first pulse-forming means for delivering said representative signals to said first switching element in a particular one of said stages in response to said dial pulses, and second pulse-forming means in each of the other of said stages for delivering said additional signals to said first switching element in succeeding ones of said stages.

9. A telephone system in accordance with claim 6 wherein said first switching element includes a semiconductor triode and said second switching element includes an electromechanical relay.

10. A dial pulse register circuit including means for providing uniform signals to said circuit in response to irregularly shaped dial pulses comprising a plurality of cascaded stages, each of said stages including transistor means transferable between a first state and a second state in response to said uniform signals, said uniform signal providing means including a capacitor responsive to said pulses for delivering said uniform signals to said transistor means, and relay means responsive to the presence of said first state in said transistor means for delivering said signals to said transistor means in succeeding ones of said stages and responsive to the presence of said second state in said transistor means for delivering said signals to said transistor means coupled thereto.

11. A register circuit including means for providing dial pulses to said circuit comprising first reference potential means; a plurality of stages, each of said stages including second reference potential means, a PNPN triode having an anode, a cathode and a control electrode, a relay connected between said cathode and said second reference potential means and operative responsive to the energization of said triode, and a plurality of contacts responsive to the operation of said relay including a first contact for transmitting signals representative of said pulses to said control electrode to energize said triode, a second contact for transmitting said signals to said cathode to de-energize said triode, and a third contact for connecting said first reference potential means to succeeding ones of said stages; and means including additional ones of said contacts for selecting one of a plurality of outputs in accordance with the digital significance of said dial pulses.

12. A register circuit in accordance with claim 11 including in addition means for connecting said first reference potential means to said anode of said triode in each of said stages to operate said relay in response to the potential difference between said first and said second reference potential means.

13. A register circuit in accordance with claim 11 wherein said means for providing dial pulses to said circuit includes a line relay operative in response to said pulses, a first transistor and a second transistor, a first relay and a second relay responsive to the operation of said first transistor and said second transistor respectively, a first plurality of contacts responsive to the operation of said first relay for coupling said first reference potential means to said anode of said triode in each of said stages and for controlling the conductivity of said second transistor, a second plurality of contacts responsive to the operation of said second relay for preventing said selection of said one of said outputs prior to the termination of said pulses, and a third plurality of contacts responsive to the operation of said line relay for governing the conductivity of said first transistor and said second transistor and for providing said signals selectively to said control electrode and said cathode of said triode in a first of said stages.

14. A dial pulse register circuit responsive to dial pulses to select one of a plurality of outputs including means for reconditioning said circuit to receive legitimate ones of said pulses after an error digit has been dialed comprising first and second common ground means; a plurality of bistable stages each including a PNPN triode, a relay operative in response to the operation of said triode, and a plurality of contacts responsive to the operation of said relay for steering signals representative of said pulses to succeeding ones of said stages and for coupling said second common ground means to said one of said outputs after said pulses have terminated; and a plurality of switching means responsive to the dialing of said error digit for connecting said first common ground means to energize each of said stages and responsive to the termination of said error digit for coupling said second common ground means to said switching means to disable said switching means and for disconnecting said first common ground means from each of said stages.

15. A dial pulse register circuit in accordance with claim 14 wherein said switching means includes a first and a second transistor, a first and a second relay operative in response to the operation of said first transistor and said second transistor respectively, and a plurality of resistors and capacitors for maintaining said first transistor and said second transistor conductive until said pulses have terminated.

No references cited.

ROBERT H. ROSE, *Primary Examiner.*

WILLIAM C. COOPER, *Examiner.*